Patented Mar. 23, 1948

2,438,208

UNITED STATES PATENT OFFICE 2,438,208

CONTINUOUS PROCESS OF CONVERTING LACTIC ACID TO POLYLACTIC ACID

Edward M. Filachione, Philadelphia, and Charles H. Fisher, Abington, Pa., assignors to the United States of America as represented by the Secretary of Agriculture No Drawing. Application July 10, 1943, Serial No. 494,174

4 Claims. (Cl. 260—78.3)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to the preparation of polymers and condensation products of hydroxy carboxylic acids, and particularly to methods of preparing such condensation products which are simple, efficient and can be operated continuously.

Hydroxy carboxylic acids, because they have two functional groups, can be converted into condensation products by self-esterification. Moreover, such polymers or self-esterification products can be made from the hydroxy acid by the removal of water, including water present as an impurity as well as water of reaction. For example, lactic acid (alpha-hydroxypropionic acid) can be converted into viscous condensation products by removal of water under reduced pressure or in the presence of entraining agents (Watson, Ind. Eng. Chem. 32, 399 (1940)). However, methods heretofore used for the self-condensation of hydroxy carboxylic acids are tedious, time-consuming and unsuitable for large-scale manufacture.

An object of our invention is to provide a simple, efficient method of converting hydroxy carboxylic acids into their polymers and condensation products.

A further object is to provide a method of effecting the self-esterification of hydroxy carboxylic acids which is suitable for continuous operation.

A further object is to provide a convenient and efficient method of concentrating solutions of hydroxy carboxylic acids.

Other objects will appear from the following description.

We have found that hydroxy carboxylic acids can be polymerized or self-esterified by continuous operation. Thus, we have found that both the water present as an impurity and that formed during the self-esterification can be removed by continuous distillation of the hydroxy carboxylic acid, or its aqueous solutions, and that this method of effecting the self-esterification is efficient and well suited for continuous large-scale manufacture of polymers or condensation products of hydroxy carboxylic acids. Our process may also be used to concentrate solutions of hydroxy acids, such as aqueous lactic acid.

Our process is particularly suited for dehydrating aqueous solutions of lactic acid and converting lactic acid into its viscous polymers. When operated for this purpose, it comprises, essentially, passing lactic acid, preferably 60 to 90 percent concentration, into a heated column or tower which operates in such a manner that water distils from the top of the column while polylactic acid is withdrawn from the bottom. Various modifications are possible in carrying out our process. For example, esterification catalysts may be used to accelerate the process; entraining agents, such as benzene, ethylene chloride, toluene, and carbon tetrachloride, may be passed into the column with the lactic acid to facilitate removal of the water; diminished pressures may be used to facilitate removal of water; and solvents may be added so that the polylactic acid is withdrawn from the column as a solution.

Our invention is illustrated by the summary of experimental data set forth in the table below. The reaction tower used in these experiments consisted of a 1-inch glass tube, 4 feet long, packed with Berl saddles, and electrically heated. A jacket for the tower is provided. Temperature was controlled automatically. The tower temperatures recorded in the table were taken at a location in the jacket (just outside the tower) two feet from the bottom of the tower. The top of the tower was provided with an inlet for introducing the lactic acid and an exit for removal of the water vapor. The water vapor was led to a condenser and collected. The bottom of the tower was attached to a receiver for collecting the polylactic acid. The system was operated under reduced pressure (produced by a water pump). Esterification catalysts, when used, were introduced into the lactic acid prior to entering the tower. The amount of catalyst was of the order of 0.1 to 2.0 percent by weight of the lactic acid used.

Table.—Dehydration and condensation of 80% lactic acid

| Lactic acid, moles | Catalyst | | Tower temp., °C. | Time, mins. | Pressure, mm. | Condensate | | Polylactic acid | | |
|---|---|---|---|---|---|---|---|---|---|---|
| | Acid | Amount, g./mole | | | | Weight, g. | Lactic acid content, g. | Dehydration, Per Cent | Weight, grams | Equiv. weight [1] |
| 2.0 | None | | 119–137 | 228 | 12 | 55 | 1.1 | 27 | 166 | 85.0 |
| 2.0 | ....do.... | | 135–150 | 86 | 12 | 56 | 8.4 | 24 | 132 | 82.5 |
| 2.0 | ....do.... | | 152–172 | 200 | 10 | 54 | | 31 | 166 | 84.0 |
| 2.0 | p-Toluene sulfonic acid | 1.0 | 121–129 | 80 | 11 | 63 | 0.8 | 61 | | 79.3 |
| 2.0 | ....do.... | 1.0 | 122–131 | 165 | 10 | 71 | 1.2 | 82 | 146 | 77.0 |
| 2.0 | ....do.... | 1.0 | 143–151 | 152 | 10 | 69 | 1.5 | 76 | 146 | 77.5 |
| 1.7 | ....do.... | 1.0 | 147–152 | 360 | 10 | 62 | 1.2 | 69 | | 75.8 |
| 2.0 | H₂SO₄ | 1.84 | 94–106 | 155 | 11 | 67.5 | 0.9 | 74 | 148 | 75.8 |
| 2.0 | ....do.... | 1.84 | 99–103 | 225 | 10 | 67.3 | 1.0 | 73 | 157 | 74.6 |
| 2.0 | ....do.... | 1.84 | 98–106 | 145 | 10 | 68.8 | 1.3 | 76 | 155 | 76.8 |
| 2.0 | ....do.... | 1.84 | 108–113 | 158 | 10 | 69.5 | 2.3 | 75 | 152 | 75.8 |
| 2.0 | ....do.... | 1.84 | 120–125 | 149 | 10 | 76.2 | 1.6 | 96 | 134 | 71.6 |
| 2.0 | ....do.... | 1.84 | 131–139 | 166 | 10 | 72.1 | 2.3 | 83 | 147 | 75.5 |
| 2.0 | ....do.... | 0.92 | 109–113 | 152 | 10 | 73.2 | 1.1 | 89 | 147 | 75.8 |
| 2.0 | ....do.... | 0.92 | 121–127 | 197 | 10 | 74.1 | 1.6 | 90 | 154 | 74.6 |
| 2.0 | ....do.... | 0.92 | 133–140 | 150 | 5–7 | 69.6 | 2.0 | 77 | 136 | 71.7 |
| 2.0 | ....do.... | 0.92 | 135–141 | 128 | 10 | 76.1 | 1.9 | 95 | 142 | 72.4 |
| 2.0 | ....do.... | 0.46 | 103–111 | 136 | 10 | 64.1 | 0.9 | 64 | 153 | 80.0 |
| 2.0 | ....do.... | 0.46 | 116–125 | 151 | 10 | 71.8 | 1.5 | 84 | 143 | 74.5 |
| 2.0 | ....do.... | 0.46 | 123–129 | 132 | 10 | 72.9 | 2.0 | 86 | 143 | 76.3 |
| 2.0 | ....do.... | 0.46 | 130–139 | 130 | 10 | 77.1 | 2.3 | 96 | 139 | 73.5 |
| 2.0 | ....do.... | 0.46 | 146–152 | 138 | 5–7 | 78.2 | 4.5 | 94 | 145 | 72.5 |
| 2.0 | ....do.... | 0.18 | 121–129 | 136 | 10 | 65.2 | 1.5 | 66 | 154 | 79.6 |
| 2.0 | ....do.... | 0.18 | 128–133 | 135 | 10 | 66.8 | 2.1 | 69 | 147 | 28.5 |
| 2.0 | ....do.... | 0.18 | 142–151 | 132 | 10 | 67.6 | 3.5 | 67 | 154 | 77.6 |
| 2.0 | ....do.... | 0.18 | 143–153 | 120 | 10 | 93.6 | 27.1 | 86 | 126 | 75.5 |
| 2.0 | ....do.... | 0.18 | 152–162 | 176 | 10 | 111.3 | 49.1 | 85 | 97 | 74.6 |
| 2.0 | ....do.... | 0.18 | 154–160 | 150 | 9 | 82.2 | 18.7 | 73 | 132 | 75.9 |
| 2.0 | ....do.... | 0.18 | 157–162 | 155 | 10 | 85.3 | 19.8 | 80 | 131 | 76.6 |
| 2.0 | ....do.... | 0.18 | 141–151 | 117 | 9 | 68.9 | 3.8 | 70 | 150 | 77.0 |
| 2.0 | ....do.... | 0.09 | 133–141 | 142 | 10 | 50.6 | 1.4 | 25 | 168 | 84.3 |
| 2.0 | ....do.... | 0.09 | 143–152 | 155 | 9–15 | 54.2 | 3.6 | 29 | 170 | 83.4 |

[1] Determined by titration with alkali.

Under some conditions of operation (see the table), considerable amounts of lactic acid, including some lactide and lactyllactic acid, distil over with the water, thus affording a method of preparing aqueous solutions of lactic acid of excellent quality. Thus, the method described herein for concentrating and condensing lactic acid can be modified so that both lactic acid solutions of high quality and polylactic acid can be prepared simultaneously. By hydrolysis and redistillation of the polylactic acid, a large proportion of the original lactic acid can be obtained in the distillate.

The above table records in condensed tabulated form the results of thirty-two runs. This table is self-explanatory. For instance, in the 26th, 27th, 28th, and 29th runs 2 moles of lactic acid (80%) mixed with 0.18 gram sulfuric acid per mole is passed down through the packed tower comprising a 1-inch glass tube, 4 feet long, the tower being maintained at a temperature between 143°–153° C., 152°–162° C., 154°–160° C., 157°–162° C. and at the stated pressure, and over the period of time stated in the fifth column.

The temperature in the heated zone is preferably of the order of 100° C. to 175° C. and the pressure is of the order 5 to 15 millimeters of mercury.

Where the purpose is also to recover aqueous lactic acid as indicated above, operation at a temperature of the order of 140° to 160° C. under a pressure of the order of 10 millimeters of mercury is preferred.

Having thus described our invention, we claim:

1. The continuous process of converting lactic acid to produce polylactic acid comprising continuously introducing an aqueous solution of lactic acid into a heated zone, disposing the lactic acid in said zone in the form of a relatively extensive moving liquid surface, compared with the volume of the acid, continuously distilling off and removing water vapor, the water vapor moving in a direction countercurrent to that of the moving liquid and in contact therewith, and removing the polylactic acid formed in the zone, the temperature in the zone being in the range 100° to 175° C., an acidic esterification catalyst being present in the lactic acid in the heated zone.

2. The process defined in claim 1, in which the esterification catalyst is sulfuric acid.

3. The process defined in claim 1, in which the esterification catalyst is p-toluene sulfonic acid.

4. The process defined in claim 1, in which the temperature in the zone is 140° to 160° C. and the pressure is 10 millimeters of mercury.

EDWARD M. FILACHIONE.
CHARLES H. FISHER.

REFERENCES CITED

The following references are of record in the file of this patent:

UNITED STATES PATENTS

| Number | Name | Date |
|---|---|---|
| 1,095,205 | Gruter et al. | May 5, 1914 |
| 1,770,875 | Burwell | July 15, 1930 |
| 1,995,970 | Dorough | Mar. 26, 1935 |
| 2,107,527 | Evans et al. | Feb. 8, 1938 |
| 2,125,383 | Macallum | Aug. 2, 1938 |
| 2,174,491 | Watson | Sept. 26, 1939 |

OTHER REFERENCES

Lycan et al., Jour. Am. Chem. Soc., Nov. 1929, pages 3450–3464.

Watson, Ind. Eng. Chem., April 1940, pages 399–401.